United States Patent
Ziaylek et al.

[11] Patent Number: 6,086,312
[45] Date of Patent: Jul. 11, 2000

[54] TANK HANDLING APPARATUS

[76] Inventors: Michael P. Ziaylek, 15 Cold Spring Ave.; Theodore Ziaylek, Jr., 140 Riverview Dr., both of Yardley, Pa. 19067

[21] Appl. No.: 09/270,875

[22] Filed: Mar. 17, 1999

[51] Int. Cl.[7] .................................................. B60P 7/06
[52] U.S. Cl. ........................................... 414/462; 414/917
[58] Field of Search ................................ 414/462, 917, 414/732, 733; 292/74, 137, 32, 170

[56] References Cited

U.S. PATENT DOCUMENTS

| | | |
|---|---|---|
| D. 294,454 | 3/1988 | Loudenslager ............ 292/137 |
| D. 331,030 | 11/1992 | Ziaylek et al. . |
| 1,788,987 | 1/1931 | Cunningham . |
| 3,058,607 | 10/1962 | Kiley . |
| 3,471,046 | 10/1969 | Hess . |
| 3,637,097 | 1/1972 | Horowitz . |
| 3,650,423 | 3/1972 | O'Brien . |
| 3,682,342 | 8/1972 | Evans . |
| 3,703,968 | 11/1972 | Uhrich et al. . |
| 3,717,271 | 2/1973 | Bargman, Jr. . |
| 4,021,070 | 5/1977 | Shea . |
| 4,059,281 | 11/1977 | Evans . |
| 4,221,529 | 9/1980 | DeShano . |
| 4,344,508 | 8/1982 | Peck . |
| 4,491,451 | 1/1985 | Willim ............ 414/917 |
| 4,556,358 | 12/1985 | Harlan . |
| 4,560,193 | 12/1985 | Beebe . |
| 4,671,387 | 6/1987 | Bourgeois ........... 414/917 |
| 4,688,308 | 8/1987 | Alvarez . |
| 4,738,582 | 4/1988 | Roberts . |
| 4,801,235 | 1/1989 | Rauschdorf ............ 414/917 |
| 4,808,056 | 2/1989 | Oshima . |
| 4,830,421 | 5/1989 | Hawelka et al. . |
| 4,872,794 | 10/1989 | Davis et al. . |
| 4,911,330 | 3/1990 | Vlaanderen et al. . |
| 5,104,280 | 4/1992 | Ziaylek et al. . |
| 5,209,628 | 5/1993 | Hassell . |
| 5,346,357 | 9/1994 | Hassell . |
| 5,366,338 | 11/1994 | Mortensen . |
| 5,440,098 | 8/1995 | Matus . |
| 5,518,357 | 5/1996 | Ziaylek et al. . |
| 5,562,386 | 10/1996 | Browning ............ 414/917 |
| 5,573,300 | 11/1996 | Simmons . |
| 5,791,857 | 8/1998 | Ziaylek, Jr. et al. . |

*Primary Examiner*—Douglas Hess
*Assistant Examiner*—Joseph A. Fischetti
*Attorney, Agent, or Firm*—Sperry, Zoda & Kane

[57] ABSTRACT

A tank handling apparatus which is usable for loading and unloading of a tank such as an oxygen tank with respect to a location of usage such as an emergency vehicle. The handling apparatus is capable of securely locking the tank in place at the storage or usage position while at the same time easily allowing it to be detached therefrom and transferred to a tank service position for removal and replacement or servicing. The apparatus includes a unique locking mechanism including a locking hook construction and a locking housing with a locking slide movably mounted therein wherein a locking handle is secured thereto for movement of the locking slide between the position of engagement and the position of release of the locking hook. Multiple locking hooks and locking slides can be utilized for further secure attachment of the tank in the storage position.

20 Claims, 4 Drawing Sheets

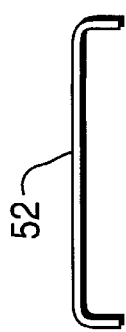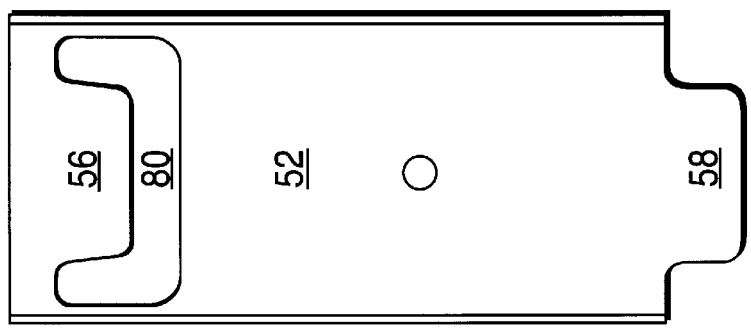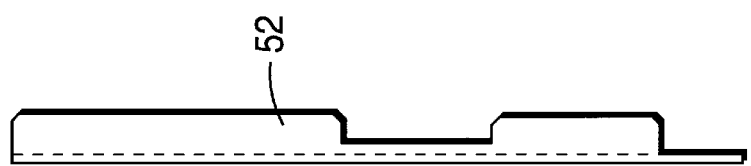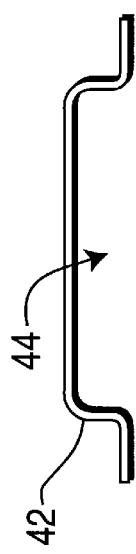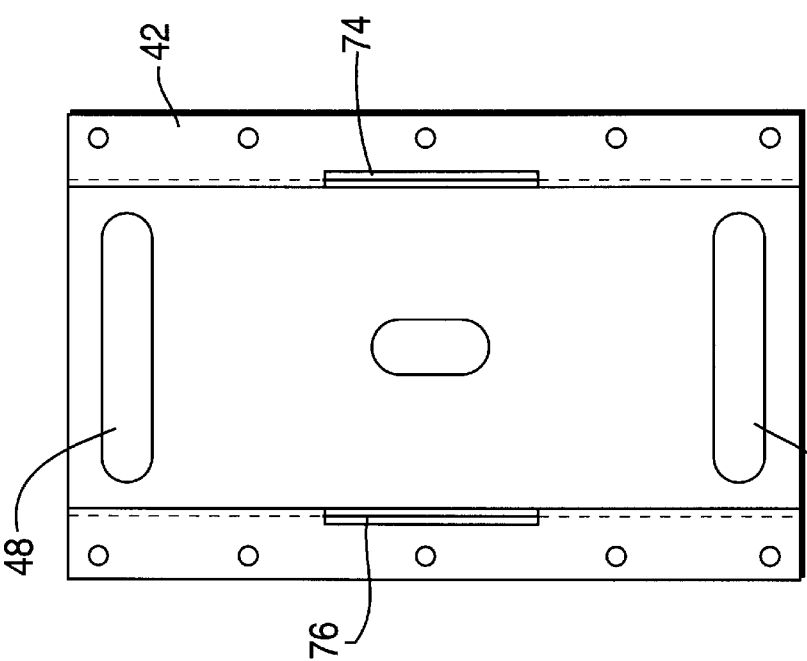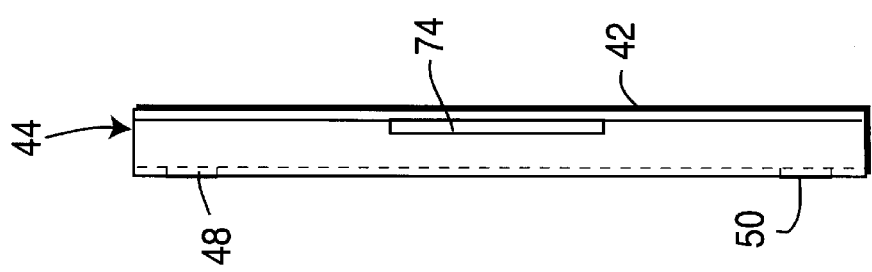

TANK HANDLING APPARATUS

BACKGROUND OF THE INVENTION

1. Field of the Invention

The present invention deals with material handling equipment and in particular for equipment for moving of heavy objects such as an oxygen tank between a storage position and a servicing position. The storage position needs to include an apparatus for securely holding such heavy tanks in a fixed manner in order to prevent it from becoming loose especially when mounted within vehicles.

When an oxygen tank is mounted within an ambulance or other emergency vehicle to provide a concentrated oxygen supply to an emergency patient, it must be secured in an absolutely rigorous manner. If the tank were to become loose, for example, as a result of a vehicular accident, then the tank itself could become a lethal projectile within the ambulance cabin. It is for this reason that it is important that a very secure locking mechanism is used for assuring detachable yet fixed retaining of such an oxygen tank in a locked storage position.

Due to the weight of these tanks, however, it is also important that the tank be capable of being removed from the locked storage position to a more accessible position for servicing thereof. This servicing could include removal and replacement of one tank with another or could comprise merely servicing of the tank. The movement of such a tank by a tank handling apparatus between the storage position and the servicing position is an important aspect of this design as well as the ability to firmly yet detachably hold the tank in a storage position with respect to the environmental structure.

2. Description of the Prior Art

Numerous patents have been granted for the purposes of material handling with respect to vehicles or handling or carrying or hoisting tanks for various purposes. These patents include U.S. Pat. No. 1,788,987 patented Jan. 13, 1931 to C. Cunningham on a "Carrier For Transporting And Dispensing Liquids"; and U.S. Pat. No. 3,058,607 patented Oct. 16, 1962 to J. T. Kiley and assigned to James A. Kiley Company on "Ladder Racks"; and U.S. Pat. No. 3,471,046 patented Oct. 7, 1969 to G. H. Hess and assigned to Stanray Corporation on a "Cart For Gas Cylinders"; and U.S. Pat. No. 3,637,097 patented Jan. 25, 1972 to Robert Horowitz and assigned to S&H Industries, Inc. on a "Power-Operated Tailgate With Maximum Rearward Displacement Between Fully Elevated And Fully Lowered Positions"; and U.S. Pat. No. 3,650,423 patented Mar. 21, 1972 to John W. O'Brien on a "Mechanical Ladle"; and U.S. Pat. No. 3,682,342 patented Aug. 8, 1972 to David Evans on "Lifting Devices"; and U.S. Pat. No. 3,703,968 patented Nov. 28, 1972 to R. Uhrich et al and assigned to The United States of America as represented by the Secretary of the Navy on a "Linear Linkage Manipulator Arm"; and U.S. Pat. No. 3,717,271 patented Feb. 20, 1973 to D. L. Bargman, Jr. and assigned to Colorado Leisure Products, Inc. on a "Vehicle Tire Carrier"; and U.S. Pat. No. 4,021,070 patented May 3, 1977 to Frank Shea on a "Mechanical Lift"; and U.S. Pat. No. 4,059,281 patented Nov. 22, 1977 to Dafydd Evans on a "Mounting Assembly For A Controllably Movable Fluid Tank"; and U.S. Pat. No. 4,221,529 patented Sep. 9, 1980 to A. DeShano on a "Delivery Trailer"; and U.S. Pat. No. 4,344,508 patented Aug. 17, 1982 to A. Peck and assigned to Alcan Research and Development Limited on a "Lift Mechanism For A Vehicle Tail-Board Or Other Load Platform"; and U.S. Pat. No. 4,556,358 patented Dec. 3, 1985 to Burton Harlan on a "Portable Hoist"; and U.S. Pat. No. 4,560,193 patented Dec. 24, 1985 to Randall Beebe on a "Carrying Device For Transporting A Cylindrical Tank"; and U.S. Pat. No. 4,688,308 patented Aug. 25, 1987 to Ramon Alvarez on a "Mobile Radiator Shop"; and U.S. Pat. No. 4,738,582 patented Apr. 19, 1988 to John Roberts and assigned to E Manufacturing Company, Inc. on a "Tank Carrier And Manipulator"; and U.S. Pat. No. 4,808,056 patented Feb. 28, 1989 to Shinnosuke Oshima on an "Elevator Device Transportable In A Motor Vehicle"; and U.S. Pat. No. 4,830,421 patented May 16, 1989 to Walter Hawelka et al and assigned to Konrad Rosenbauer KG on a "Service Vehicles"; and U.S. Pat. No. 4,872,794 patented Oct. 10, 1989 to Gail David et al and assigned to Halliburton Company on a "Tank Mounting Apparatus"; and U.S. Pat. No. 4,911,330 patented Mar. 27, 1990 to James Vlaanderen et al and assigned to Iowa Mold Tooling Company, Inc. on a "Service Vehicle With Dispensing System"; and U.S. Pat. No. 5,104,280 patented Apr. 14, 1992 to Michael P. Ziaylek et al and assigned to Michael P. Ziaylek on an "Apparatus For Use With An Emergency Vehicle For Storage And Retrieval Of Remotely Located Emergency Devices"; and U.S. Pat. No. Des. 331,030 patented Nov. 17, 1992 to Michael P. Ziaylek et al and assigned to Michael P. Ziaylek on a "Unit For Use With An Emergency Vehicle For Storage And Retrieval Of Remotely Located Emergency Devices"; and U.S. Pat. No. 5,209,628 patented May 11, 1993 to C. Hassell on a "Self-Loading Dolly Mount Apparatus"; and U.S. Pat. No. 5,346,357 patented Sep. 13, 1994 to C. Hassell on a "Self-Locking Parallel-Motion Dolly Mount"; and U.S. Pat. No. 5,366,338 patented Nov. 22, 1994 to ED. Mortensen on a "Lift And Tow Motorcycle Transporter"; and U.S. Pat. No. 5,440,098 patented Aug. 8, 1995 to T. Matus and assigned to Miller Electric Manufacturing Co. on a "Gas Cylinder Lifting System"; and U.S. Pat. No. 5,518,357 patented May 21, 1996 to Michael P. Ziaylek and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,573,300 patented Nov. 12, 1996 to M. Simmons on "Utility Vehicles With Interchangeable Emergency Response Modules"; and U.S. Pat. No. 5,717,271 patented Feb. 10, 1998 to Susumu Aoki et al and assigned to Mitsuba Corporation on a "Brush Holder Device And Method Of Molding Same"; and U.S. Pat. No. 5,791,857 patented Aug. 11, 1998 to Theodore Ziaylek, Jr. et al and assigned to Theodore Ziaylek, Jr. and Michael Paul Ziaylek on an "Automatic Ladder Lowering And Storage Device For Use With An Emergency Vehicle".

SUMMARY OF THE INVENTION

The present invention provides a tank handling apparatus which is usable for transferring a tank repeatedly between a locked tank storage position and an accessible tank servicing position. This apparatus is particularly usable for securing of such a tank, like an oxygen tank, with respect to an emergency vehicle. The apparatus includes a base member with an arm assembly pivotally secured thereto and movably extendable outwardly away therefrom. A tank retaining device is detachably securable with respect to a tank for holding thereof and aiding the handling by the apparatus. The tank retaining device is preferably pivotally attached to the arm assembly in such a manner as to be movable therewith. The retaining tank device and arm assembly are preferably movable between a tank servicing position for accessing the tank for servicing thereof and the tank storage position to facilitate retainment of the tank with respect to the base. In most configurations the tank servicing position will be at a lower elevation than the tank storage position to facilitate servicing.

An actuator preferably formed as an electrical actuator will include a longitudinally extendable and retractable member and will be pivotally secured with respect to the base member and the arm assembly. The actuator is preferably operable to longitudinally extend in order to urge movement of the arm assembly to the tank servicing position. It is preferably longitudinally retractable to urge movement of the arm assembly to the tank storage position.

A locking mechanism is included in the apparatus of the present invention including a locking hook fixedly secured to the tank retaining member. A locking housing is attached to the base and is at least partially spaced therefrom to define a locking channel therebetween. The locking housing also defines a locking slot therein adjacent the locking channel. This locking slot is adapted to receive the locking hook extending therethrough into the locking channel responsive to the tank retaining device being in the tank storage position in order to facilitate selective securement thereof with respect to the base member.

In a preferred configuration the locking housing also includes a first handle opening and a second handle opening to facilitate operational control of movement of a locking slide which will be movably mounted within the locking channel. This locking slide will preferably include at least one locking tongue positionable adjacent the locking slot in order to be adapted to engage the locking hook positioned extending through the locking slot into the locking channel for selective securement of the tank retaining device in the tank storage orientation. The locking slide preferably is movable within the locking channel between an engaged position retaining the locking hook with respect to the base member and a disengaged position releasing the locking hook from the base member.

A locking handle will preferably be included pivotally secured with respect to the base member and pivotally attached to the locking slide to urge movement thereof. The locking handle is pivotally movable to the locking position to urge movement of the locking slide to the engaged position. The locking handle is also pivotally movable to the unlocking position to urge movement of the locking slide to the disengaged position. The locking handle is pivotally secured to the locking slide at a position within the locking channel in order to facilitate controlled movement between the locking position and the unlocking position thereof. The locking handle extends through the first handle opening into and through the locking channel and outwardly therefrom through the second handle opening. The locking handle is pivotally attached with respect to the locking housing at a position outside of the locking channel adjacent the second handle opening. The locking handle includes a handle grip section positioned outside of the locking channel adjacent the first handle opening to facilitate grasping thereof for urging movement of the locking slide between the engaged position and the disengaged position. A hydraulic damper is also preferably included pivotally secured to the base member and with respect to the arm assembly to facilitate stabilizing of movement of the arm assembly between the tank storage position and the tank servicing position as its movement is urged by the electric actuator device.

It is an object of the present invention to provide a tank handling apparatus for transferring a tank between a locked tank storage position and an accessible tank servicing position wherein usage within an emergency vehicle cabin is made possible for the purposes of extreme safety.

It is an object of the present invention to provide a tank handling apparatus for transferring a tank between a locked tank storage position and an accessible tank servicing position wherein the orientation of the tank is maintained vertically in the storage position and in the servicing position and at all points during movement therebetween.

It is an object of the present invention to provide a tank handling apparatus for transferring a tank between a locked tank storage position and an accessible tank servicing position wherein four individual control arms interconnect a base member with the tank holding bracket to facilitate firm securement thereof.

It is an object of the present invention to provide a tank handling apparatus for transferring a tank between a locked tank storage position and an accessible tank servicing position wherein a locking mechanism is utilized including a movable locking slide adapted to engage a locking hook which is fixedly secured to the tank retaining means for detachably and securely holding of the tank and the tank retaining device with respect to the base member and the surrounding environmental structure.

It is an object of the present invention to provide a tank handling apparatus for transferring a tank between a locked tank storage position and an accessible tank servicing position wherein usage with tanks having various diameters and various heights is made possible.

It is an object of the present invention to provide a tank handling apparatus for transferring a tank between a locked tank storage position and an accessible tank servicing position wherein medical oxygen cylinders can be firmly secured within an emergency vehicle patient cabin and easily removed for the purposes of recharging or replacement.

It is an object of the present invention to provide a tank handling apparatus for transferring a tank between a locked tank storage position and an accessible tank servicing position wherein tanks having weights as great as 205 lbs. can be easily moved.

It is an object of the present invention to provide a tank handling apparatus for transferring a tank between a locked tank storage position and an accessible tank servicing position wherein a locking mechanism provides a safety locking apparatus for holding the tank in the storage position during normal usage thereof and during normal usage of the emergency vehicle within which it is used.

It is an object of the present invention to provide a tank handling apparatus for transferring a tank between a locked tank storage position and an accessible tank servicing position wherein the handle for locking or unlocking of the tank in the storage position is easily reversible laterally.

It is an object of the present invention to provide a tank handling apparatus for transferring a tank between a locked tank storage position and an accessible tank servicing position wherein transferring between positions is completely automated and is powered by an electrical actuator.

It is an object of the present invention to provide a tank handling apparatus for transferring a tank between a locked tank storage position and an accessible tank servicing position wherein multiple arms are utilized for supporting the tank and tank retaining member with respect to the mounting base and wherein this movement is dampened by a hydraulic damper member.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 6 is a front plan view of an embodiment of the locking housing of the present invention;

FIG. 7 is a top plan view of the housing shown in FIG. 6;

FIG. 8 is a side plan view of the housing shown in FIG. 6;

FIG. 9 is a front plan view of an embodiment of the locking slide of the present invention;

FIG. 10 is a top plan view of the slide shown in FIG. 9;

FIG. 11 is a side plan view of the side shown in FIG. 9;

DETAILED DESCRIPTION OF THE PREFERRED EMBODIMENT

Figure 1:
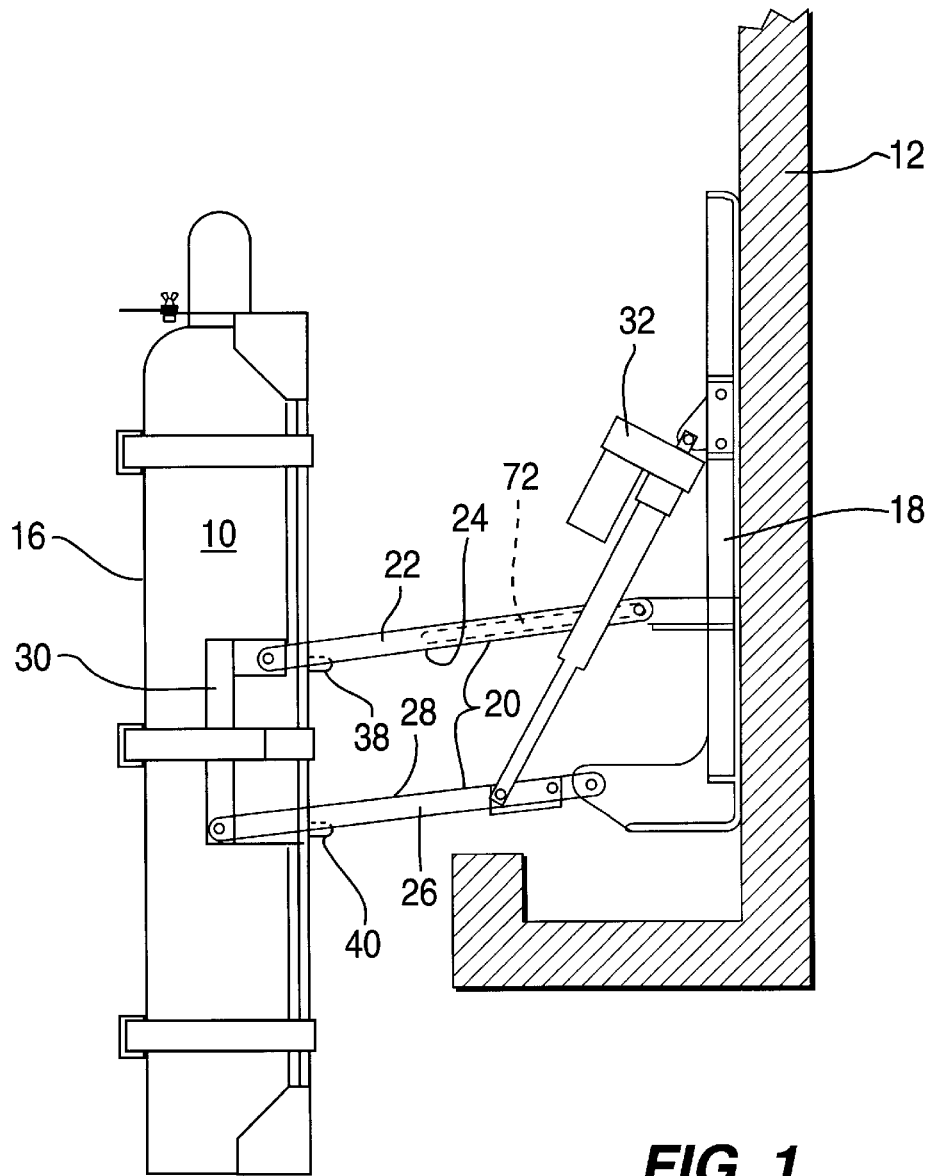
FIG. 1 is a side plan view of an embodiment of the tank handling apparatus of the present invention as shown in the servicing position.
Figure 13:
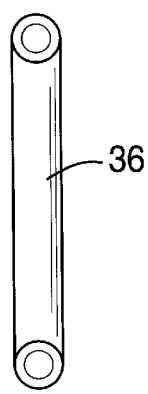
FIG. 13 is a rear plan view of the locking hook shown in FIG. 12.
Figure 12:
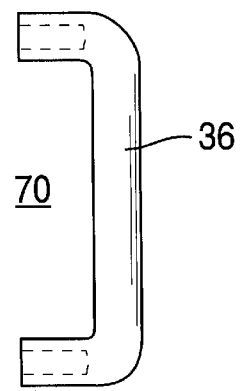
FIG. 12 is a top plan view of an embodiment of the locking hook of the present invention.
Figure 4:
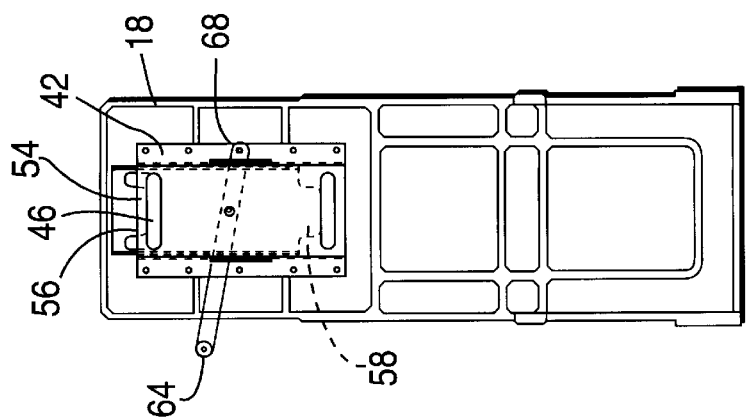
FIG. 4 is a front plan view of the base member and an assembled locking mechanism of the apparatus of the present invention.
Figure 3:
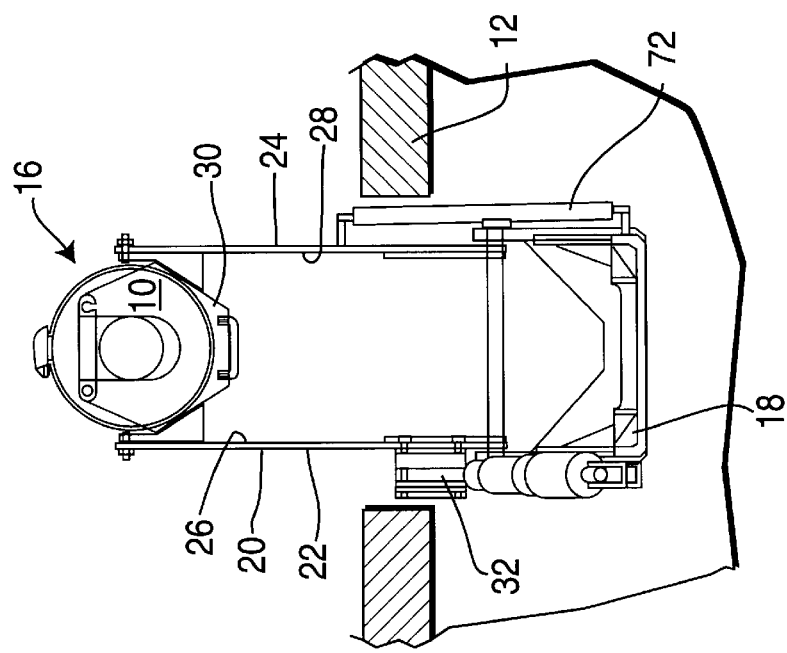
FIG. 3 is a top plan view of the apparatus shown in the position of FIG. 1.
Figure 2:
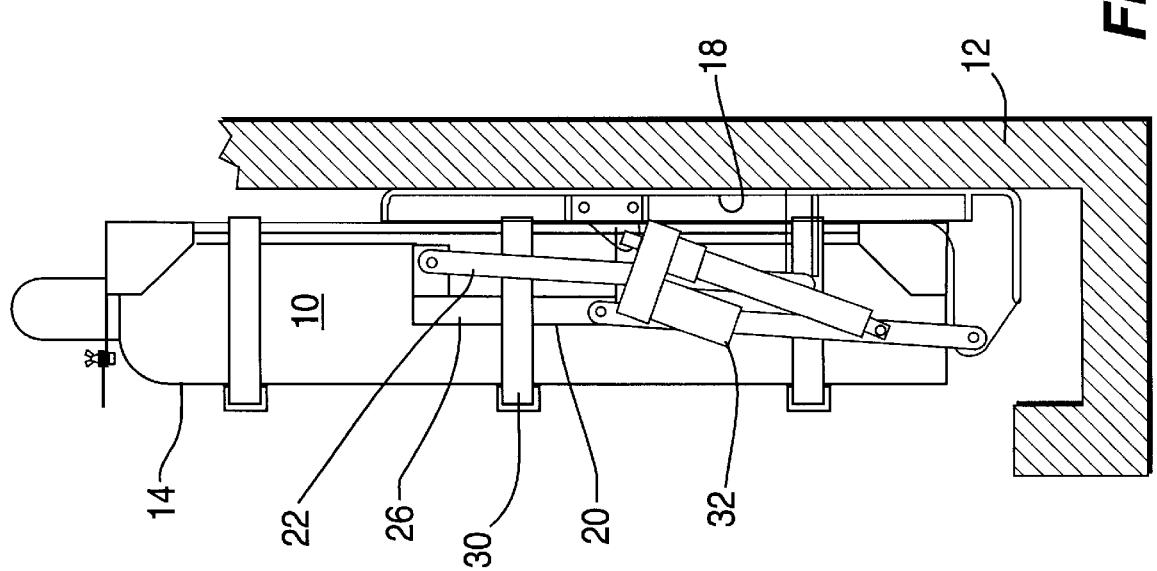
FIG. 2 is a side plan view of the apparatus of FIG. 1 shown in the storage position.

The present invention provides a unique apparatus for handling of tanks 10 in such a manner as to allow movement thereof between a locking tank storage position 14 and an accessible tank servicing position 16. This is particularly important when a heavy tank such as a 150–200 lb. oxygen tank is stored in an emergency vehicle 10. Such a tank can be used for the purposes of supplying concentrated oxygen to patients and it is important that the tank be held in a fixed storage position in the patient servicing cabin in a firm manner such that it will not become loose during vehicle operation and due to the motion of the vehicle itself become airborne and extremely dangerous to individuals in the emergency patient cabin or compartment.

As such, an emergency vehicle 12 should define a specific locked tank storage position 14 which detachably and yet firmly secures the tank 10 fixedly with respect to the vehicle 12. It is also necessary, however, to periodically service the tank and for this reason the tank handling apparatus of the present invention is capable of transferring the tank between the locked tank storage position and the accessible tank servicing position. When used with an emergency vehicle 12 the accessible tank servicing position 16 will normally be outside of the vehicle with the tank at a position less elevated than the locked tank storage position 14. At this position the tank can be removed and replaced or the tank itself can be maintained or serviced as necessary.

The specific construction of the handling apparatus includes a base member 18 which is fixedly secured to the environmental structure which most likely be an emergency vehicle 12. An arm assembly 20 is pivotally secured with respect to the base 18. In the preferred configuration the arm assembly 20 will include four individual arm members including a first upper arm 22, a second upper arm 24, a first lower arm 26 and a second lower arm 28. By utilizing these arms connected in a parallel system wherein they extend away from the arm assembly approximately parallel with respect to one another, the tank is maintained in vertical orientation as it is moved at all times between the storage position and the servicing position. Preferably the first upper arm 22 and the second upper arm 24 are laterally spaced from one another to provide lateral stability to the tank 10 when secured to the tank retaining means 30. The first lower arm 26 and the second lower arm 28 are also laterally spaced with respect to one another at a position below the respective upper arms to maintain vertical stability of the tank retaining means 30 with the tank 10 secured thereto.

Powering of movement is achieved by an actuator means such as an electrical actuator means 32 which includes a longitudinally extensible and retractable member. This member is secured to the base 18 and the tank retaining means 30. The actuator with the longitudinally movable member is pivotally secured at one end to the base 18 and pivotally secured at the other end to the arm assembly 20 and preferably to the first lower arm 26. With this configuration extending of the electric actuator 32 will cause movement of the arm assembly 20 and the tank retaining member 30 to the accessible tank servicing position. Similarly but oppositely retraction of the electric actuator 32 will cause movement of the arm assembly 20 and the tank 10 secured to the tank retaining member 30 to the tank storage position.

At the tank storage position a locking mechanism 34 is included which facilitates firm securement of the tank in the tank storage position and yet allows it to be detachable by unlocking thereof. The locking mechanism 34 includes a locking hook 36 which preferably takes the form of both an upper locking hook member 38 and a lower locking hook member 40. The locking hook members preferably extend rearwardly from the tank retaining means 30 and are adapted to extend through locking slots 46 in the locking housing 42. Preferably locking housing 42 will define an upper locking slot 48 adapted to receive the upper locking hook member 38 and a lower locking slot 50 adapted to receive the lower locking hook member 40.

The locking housing 42 will be secured to the base member 18 and will include a portion thereof spatially disposed from the base member 18 to define a locking channel means 44 therebetween. A locking slide 52 will be vertically movably mounted within the locking channel 44. Each locking slide will include a locking tongue 54 which comprises preferably an upper locking tongue 56 and a lower locking tongue 58.

This locking slide 52 is positioned with the upper locking tongue 56 and the lower locking tongue 58 immediately adjacent the upper locking slot 48 and the lower locking slot 50. In this configuration with the upper locking hook member 38 and the lower locking hook member 40 extending through the upper locking slot 48 and the lower locking slot 50 the upper locking tongue 56 can be movable downwardly such that it then extends through and behind the upper locking hook member 38 for securement thereof with respect to the base 18. In a similar manner the lower locking tongue 58 will extend downwardly through the hook opening means 70 defined behind the lower locking hook member 40 and thereby further facilitate locking of the tank retaining means 30 with respect to the base 18 and the emergency vehicle 12.

With both of the locking tongues 56 and 58 extending through the upper and lower locking hook members 38 and 40 the locking slide 52 and the generic locking mechanism 34 will be defined to be in the engaged position.

Movement to the disengaged position 62 is achieved by moving the locking slide 52 vertically upwardly and thereby removing engagement between the upper locking tongue 56 and the upper locking hook member 38 and removing engagement between the lower locking tongue 58 and the lower locking hook member 40. Movement between the engaged position 60 and the disengaged position 62 is facilitated by the inclusion of a locking handle 64. Locking handle 64 is movable between a downwardmost locking position 66 with the locking slide 52 moved downwardly into the engaged position 60 and the unlocked position 68 with the locking slide 52 moved to the disengaged position 62. Movement of the locking handle 64 is facilitated by the defining of a handle grip section 78 thereon.

In the preferred configuration of the locking mechanism the locking housing 42 will define a first handle opening 74 laterally thereon and a second handle opening 76 laterally but oppositely located thereon. These handle openings will provide for ease of movement of the locking handle 64. With this configuration the locking handle 64 will preferably be pivotally secured to the base member 18 at a position external to the locking channel 44. The handle will then extend through the second handle opening 76 into the locking channel 44 and therewithin will be pivotally secured with respect to the locking slide 52. The channel will then extend outwardly through the second handle opening 76 and thereby exit the locking channel 44. The handle grip section 78 will then be defined adjacent the first handle opening 74 at a position on the locking handle 64 external from the locking channel 44.

Figure 5:
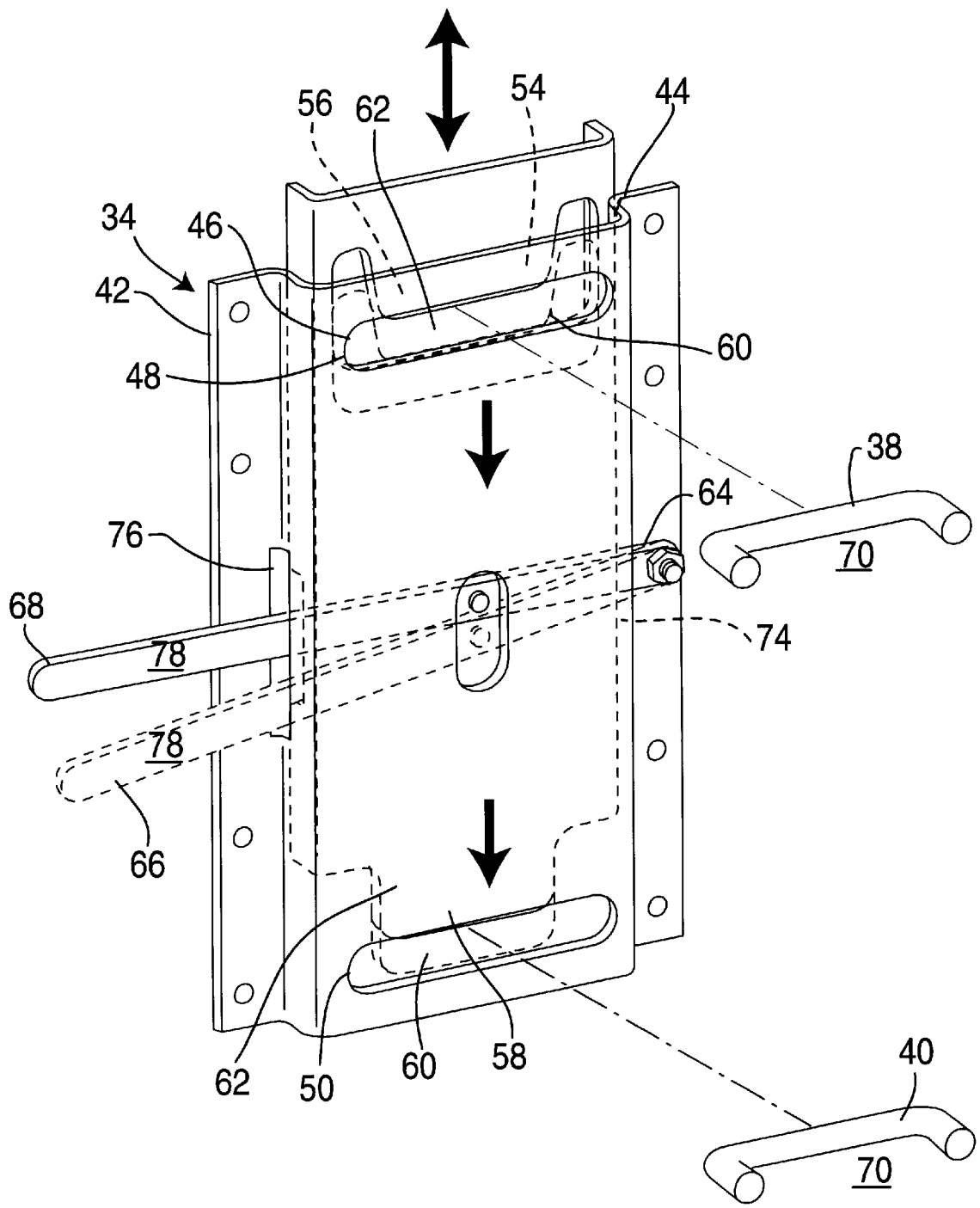
FIG. 5 is a partial breakaway perspective illustration of an embodiment of the locking mechanism of the present invention.

With this configuration, as best shown in FIG. 5, movement of the handle grip section 78 downwardly will cause pivotal movement of the locking handle 64 downwardly and downward movement of the locking slide 52 and the locking tongues 56 and 58 defined thereon. These upper and lower locking tongues 56 and 58 will extend through the upper locking hook member 38 and the lower locking hook member 40 respectively and in this manner firmly secure the tank retaining member 30 and the tank 10 with respect to the base member 18.

Subsequent movement upwardly of the handle grip section 78 will cause the upper locking tongue 56 and the lower locking tongue 58 both to move to the disengaged position 68 thereby releasing the upper locking hook member 38 and the lower locking hook member 40 and allowing the actuator means 32 to longitudinally extend and urge movement of the tank retaining member 30 and the tank 10 from the storage position to the servicing position.

To prevent undesirable vibrations or racking of the arm assembly 20 which might occur to the use of four individual arm members 22, 24, 26 and 28, it is preferable that a damper member such as a hydraulic damper member 72 be pivotally secured on one end to the base 18 and on the other end to the arm assembly 20. Preferably the hydraulic damper member 72 will be pivotally secured specifically with respect to the second upper arm 28 for damping unwanted movement thereof.

The locking slide 52 May include an engagement orifice 80 defined immediately below the upper locking tongue 56 into which the upper locking hook member 38 will extend to facilitate downward movement of the upper locking tongue 56 into engagement with the upper locking hook member 38. This is purely optional and is in the configuration of the locking slide shown in FIG. 5 and FIG. 9.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A tank handling apparatus for transferring a tank between a locked tank storage position and an accessible tank servicing position particularly usable within an emergency vehicle comprising:

A. a base member;

B. an arm assembly pivotally attached to said base member and movably extending outwardly therefrom;

C. a tank retaining means being detachably securable with respect to a tank for holding thereof and to facilitate handling thereof, said tank retaining means being pivotally attached to said arm assembly to be movable therewith, said tank retaining means and said arm assembly being movable between a tank servicing position for accessing the tank for servicing thereof and a tank storage position for secure retainment of the tank with respect to said base member;

D. an actuator means being longitudinally extensible and retractable and being pivotally secured to said base member and to said arm assembly, said actuator means being longitudinally extensible to urge movement of said arm assembly to the tank servicing position and being longitudinally retractable to urge movement of said arm assembly to the tank storage position; and E. a locking mechanism comprising:

(1) a locking hook means fixedly secured to said tank retaining means;

(2) a locking housing means attached to said base member and at least partially spatially disposed therefrom to define therebetween a locking channel means, said locking housing means further defining a locking slot means therein adjacent said locking channel means, said locking slot means being adapted to receive said locking hook means extending therethrough into said locking channel means responsive to said tank retaining means being in the tank storage position for facilitating selective securement thereof with respect to said base member;

(3) a locking slide means mounted movably within said locking channel means defined between said locking housing means and said base member, said locking slide means defining a locking tongue means positionable adjacent said locking slot means and adapted to be engageable with said locking hook means positioned extending through said locking slot means into said locking channel means for selective securement of said tank retaining means in the tank storage position, said locking slide means being movable within said locking channel means between an engaged position retaining said locking hook means with respect to said base member and a disengaged position releasing said locking hook means from said base member;

(4) a locking handle means pivotally secured to said base member and pivotally attached to said locking slide means to urge movement thereof, said locking handle means being pivotally movable to a locking position to urge movement of said locking slide means to the engaged position, said locking handle means being pivotally movable to an unlocking position to urge movement of said locking slide means to the disengaged position.

2. A tank handling apparatus for transferring a tank between a locked tank storage position and an accessible tank servicing position particularly usable within an emergency vehicle as defined in claim 1 wherein said locking hook means defines a hook opening means therein and wherein said locking tongue means is adapted to selectively extend into said hook opening means positioned within said locking channel means to facilitate selective retainment of said locking hook means and the tank with respect to said base member with said tank retaining means in the tank storage position.

3. A tank handling apparatus for transferring a tank between a locked tank storage position and an accessible tank servicing position particularly usable within an emergency vehicle as defined in claim 1 further comprising a hydraulic damper member pivotally secured to said base member and pivotally secured with respect to said arm assembly to facilitate stabilizing of the movement of said arm assembly between the tank storage position and the tank servicing position.

4. A tank handling apparatus for transferring a tank between a locked tank storage position and an accessible tank servicing position particularly usable within an emergency vehicle as defined in claim 1 wherein said locking housing means defines a first handle opening means and a second handle opening means therein wherein said locking handle means is pivotally secured to said locking slide means at a position thereon within said locking channel means to facilitate controlled movement thereof between the locking position and the unlocking position.

5. A tank handling apparatus for transferring a tank between a locked tank storage position and an accessible tank servicing position particularly usable within an emergency vehicle as defined in claim 4 wherein said locking handle means extends through said first handle opening means into and through said locking channel means and outwardly through said second handle opening means, said locking handle means being pivotally attached with respect to said locking housing means at a position outside of said locking channel means adjacent said second handle opening means.

6. A tank handling apparatus for transferring a tank between a locked tank storage position and an accessible tank servicing position particularly usable within an emergency vehicle as defined in claim 5 wherein said locking handle means includes a handle grip section positioned outside of said locking channel means adjacent said first handle opening means to facilitate grasping thereof for urging movement of said locking slide means between the engaged position and the disengaged position.

7. A tank handling apparatus for transferring a tank between a locked tank storage position and an accessible tank servicing position particularly usable within an emergency vehicle as defined in claim 4 wherein said locking handle means is positionable extending through said second handle opening means into and through said locking channel means and outwardly through said first handle opening means to facilitate reversing of positioning of said locking handle means with respect to said base member with said locking handle means being pivotally attached with respect to said locking housing means at a position outside of said locking channel means adjacent said first handle opening means.

8. A tank handling apparatus for transferring a tank between a locked tank storage position and an accessible tank servicing position particularly usable within an emergency vehicle as defined in claim 7 wherein said locking handle means includes a handle grip section positioned outside of said locking channel means adjacent said second handle opening means.

9. A tank handling apparatus for transferring a tank between a locked tank storage position and an accessible tank servicing position particularly usable within an emergency vehicle as defined in claim 1 wherein said actuator means is electric.

10. A tank handling apparatus for transferring a tank between a locked tank storage position and an accessible tank servicing position particularly usable within an emergency vehicle as defined in claim 1 wherein said tank storage position is at a higher elevation than said tank servicing position.

11. A tank handling apparatus for transferring a tank between a locked tank storage position and an accessible tank servicing position particularly usable within an emergency vehicle as defined in claim 1 wherein said locking slide means defines an engagement orifice therein with said locking tongue extending thereinto, said engagement orifice being selectively registrable with said locking slot means in said locking housing means for receiving of said locking hook means extending therethrough to facilitate engagement of said locking tongue means with respect to said locking hook means.

12. A tank handling apparatus for transferring a tank between a locked tank storage position and an accessible tank servicing position particularly usable within an emergency vehicle as defined in claim 1 wherein said arm assembly comprises:

A. a first upper arm pivotally secured to said tank retaining means and pivotally secured with respect to said base member to urge and control movement of said tank retaining means between the tank storage position and the tank servicing position;

B. a second upper arm pivotally secured to said tank retaining means spatially disposed laterally from said first upper arm, said second upper arm also being pivotally secured with respect to said base member to urge and control movement of said tank retaining means between the tank storage position and the tank servicing position;

C. a first lower arm pivotally secured to said tank retaining means below said first upper arm and pivotally secured with respect to said base member to urge and control movement of said tank retaining means between the tank storage position and the tank servicing position; and B. a second lower arm pivotally secured to said tank retaining means below said second upper arm and spatially disposed laterally from said first lower arm, said second upper arm also being pivotally secured with respect to said base member to urge and control movement of said tank retaining means between the tank storage position and the tank servicing position.

13. A tank handling apparatus for transferring a tank between a locked tank storage position and an accessible tank servicing position particularly usable within an emergency vehicle as defined in claim 12 wherein said actuator means is pivotally secured to said first lower arm of said arm assembly.

14. A tank handling apparatus for transferring a tank between a locked tank storage position and an accessible tank servicing position particularly usable within an emergency vehicle as defined in claim 12 further comprising a hydraulic damper member pivotally secured to said base member and pivotally secured with respect to said second upper arm of said arm assembly to facilitate stabilizing of the movement of said arm assembly between the tank storage position and the tank servicing position.

15. A tank handling apparatus for transferring a tank between a locked tank storage position and an accessible tank servicing position particularly usable within an emergency vehicle as defined in claim 1 wherein said locking hook means comprises:

A. an upper locking hook member; and

B. a lower locking hook member spatially disposed vertically from said upper locking hook member to facilitate selective retaining of said tank retaining means in the tank storage position.

16. A tank handling apparatus for transferring a tank between a locked tank storage position and an accessible tank servicing position particularly usable within an emergency vehicle as defined in claim 15 wherein said locking slot means of said locking housing means defines a upper locking slot and a lower locking slot spatially disposed vertically therefrom, said upper locking slot adapted to receive said upper locking hook member extending therethrough for selective securement therein to facilitate selective holding of said tank retaining means in the tank storage position, and, simultaneously, said lower locking slot adapted to receive said lower locking hook member extending therethrough for selective securement therein to facilitate selective holding of said tank retaining means in the tank storage position.

17. A tank handling apparatus for transferring a tank between a locked tank storage position and an accessible tank servicing position particularly usable within an emergency vehicle as defined in claim 16 wherein said locking slide means includes:

A. an upper locking tongue positionable adjacent said upper locking slot and adapted to be engageable with said upper locking hook member positioned extending through said upper locking slot into said locking channel means for selective securement of said tank retaining means to said base member in the tank storage position; and B. a lower locking tongue positioned below said upper locking tongue and being positionable adjacent said lower locking slot, said lower locking tongue adapted to be engageable with said lower locking hook member positioned extending through said lower locking slot into said locking channel means for selective securement of said tank retaining means to said base member in the tank storage position.

18. A tank handling apparatus for transferring a tank between a locked tank storage position and an accessible tank servicing position particularly usable within an emergency vehicle as defined in claim 17 wherein said lower locking tongue is positioned directly below said upper locking tongue to maintain said tank retaining means and the tank in vertically orientation.

19. A tank handling apparatus for transferring a tank between a locked tank storage position and an accessible tank servicing position particularly usable within an emergency vehicle comprising:

A. a base member; and

B. an arm assembly pivotally attached to said base member and movably extending outwardly therefrom;

C. a tank retaining means being detachably securable with respect to a tank for holding thereof and to facilitate handling thereof, said tank retaining means being pivotally attached to said arm assembly to be movable therewith, said tank retaining means and said arm assembly being movable between a tank servicing position for accessing the tank for servicing thereof and a tank storage position for secure retainment of the tank with respect to said base member, the tank servicing position being at a lower elevation than the tank storage position;

D. an actuator means being longitudinally extensible and retractable and being pivotally secured to said base member and to said arm assembly, said actuator means being electrically powered and being longitudinally extensible to urge movement of said arm assembly to the tank servicing position and being longitudinally retractable to urge movement of said arm assembly to the tank storage position;

E. a locking mechanism comprising:

(1) a locking hook means fixedly secured to said tank retaining means;

(2) a locking housing means attached to said base member and at least partially spatially disposed therefrom to define therebetween a locking channel means, said locking housing means further defining a locking slot means therein adjacent said locking channel means, said locking slot means being adapted to receive said locking hook means extending therethrough into said locking channel means responsive to said tank retaining means being in the tank storage position for facilitating selective securement thereof with respect to said base member, said locking housing means defining a first handle opening means and a second handle opening means therein;

(3) a locking slide means mounted movably within said locking channel means defined between said locking housing means and said base member, said locking slide means defining a locking tongue means positionable adjacent said locking slot means and adapted to be engageable with said locking hook means positioned extending through said locking slot means into said locking channel means for selective securement of said tank retaining means in the tank storage position, said locking slide means being movable within said locking channel means between an engaged position retaining said locking hook means with respect to said base member and a disengaged position releasing said locking hook means from said base member;

(4) a locking handle means pivotally secured to said base member and pivotally attached to said locking slide means to urge movement thereof, said locking handle means being pivotally movable to a locking position to urge movement of said locking slide means to the engaged position, said locking handle means being pivotally movable to an unlocking position to urge movement of said locking slide means to the disengaged position, said locking handle means being pivotally secured to said locking slide means at a position thereon within said locking channel means to facilitate controlled movement thereof between the locking position and the unlocking position, said locking handle means extending through said first handle opening means into and through said locking channel means and outwardly through said second handle opening means, said locking handle means being pivotally attached with respect to said locking housing means at a position outside of said locking channel means adjacent said second handle opening means, said locking handle means including a handle grip section positioned outside of said locking channel means adjacent said first handle opening means to facilitate grasping thereof for urging movement of said locking slide means between the engaged position and the disengaged position; and F. a hydraulic damper member pivotally secured to said base member and pivotally secured with respect to said arm assembly to facilitate stabilizing of the movement of said arm assembly between the tank storage position and the tank servicing position.

20. A tank handling apparatus for transferring a tank between a locked tank storage position and an accessible tank servicing position particularly usable within an emergency vehicle comprising:

A. a base member; and

B. an arm assembly pivotally attached to said base member and movably extending outwardly therefrom, said arm assembly comprising:
  (1) a first upper arm pivotally secured to said tank retaining means and pivotally secured with respect to said base member to urge and control movement of said tank retaining means between the tank storage position and the tank servicing position;
  (2) a second upper arm pivotally secured to said tank retaining means spatially disposed laterally from said first upper arm, said second upper arm also being pivotally secured with respect to said base member to urge and control movement of said tank retaining means between the tank storage position and the tank servicing position;
  (3) a first lower arm pivotally secured to said tank retaining means below said first upper arm and pivotally secured with respect to said base member to urge and control movement of said tank retaining means between the tank storage position and the tank servicing position; and
  (4) a second lower arm pivotally secured to said tank retaining means below said second upper arm and spatially disposed laterally from said first lower arm, said second upper arm also being pivotally secured with respect to said base member to urge and control movement of said tank retaining means between the tank storage position and the tank servicing position;

C. a tank retaining means being detachably securable with respect to a tank for holding thereof and to facilitate handling thereof, said tank retaining means being pivotally attached to said arm assembly to be movable therewith, said tank retaining means and said arm assembly being movable between a tank servicing position for accessing the tank for servicing thereof and a tank storage position for secure retainment of the tank with respect to said base member, the tank servicing position being at a lower elevation than the tank storage position;

D. an actuator means being longitudinally extensible and retractable and being pivotally secured to said base member and to said first lower arm of said arm assembly, said actuator means being electrically powered and being longitudinally extensible to urge movement of said arm assembly to the tank servicing position and being longitudinally retractable to urge movement of said arm assembly to the tank storage position;

E. a locking mechanism comprising:
  (1) a locking hook means fixedly secured to said tank retaining means and comprising:
    (a) an upper locking hook member;
    (b) a lower locking hook member spatially disposed vertically from said upper locking hook member to facilitate selective retaining of said tank retaining means in the tank storage position with the tank extending in a vertical orientation;
  (2) a locking housing means attached to said base member and at least partially spatially disposed therefrom to define therebetween a locking channel means, said locking housing means further defining a locking slot means therein adjacent said locking channel means, said locking slot means defining an upper locking slot and a lower locking slot spatially disposed vertically therefrom, said upper locking slot adapted to receive said upper locking hook member extending therethrough for selective securement therein to facilitate selective holding of said tank retaining means in the tank storage position, said locking slot means being adapted to receive said locking hook means extending therethrough into said locking channel means responsive to said tank retaining means being in the tank storage position for facilitating selective securement thereof with respect to said base member, and, simultaneously, said lower locking slot adapted to receive said lower locking hook member extending therethrough for selective securement therein to facilitate selective holding of said tank retaining means in the tank storage position, said locking housing means defining a first handle opening means and a second handle opening means therein;
  (3) a locking slide means mounted movably within said locking channel means defined between said locking housing means and said base member, said locking slide means defining a locking tongue means positionable adjacent said locking slot means and adapted to be engageable with said locking hook means positioned extending through said locking slot means into said locking channel means for selective securement of said tank retaining means in the tank storage position, said locking slide means being movable within said locking channel means between an engaged. position retaining said locking hook means with respect to said base member and a disengaged position releasing said locking hook means from said base member, said locking slide means including:
    (a) an upper locking tongue positionable adjacent said upper locking slot and adapted to be engageable with said upper locking hook member positioned extending through said upper locking slot into said locking channel means for selective securement of said tank retaining means to said base member in the tank storage position;
    (b) a lower locking tongue positioned below said upper locking tongue and being positionable adjacent said lower locking slot, said lower locking tongue adapted to be engageable with said lower locking hook member positioned extending through said lower locking slot into said locking channel means for selective securement of said tank retaining means to said base member in the tank storage position;

(4) a locking handle means pivotally secured to said base member and pivotally attached to said locking slide means to urge movement thereof, said locking handle means being pivotally movable to a locking position to urge movement of said locking slide means to the engaged position, said locking handle means being pivotally movable to an unlocking position to urge movement of said locking slide means to the disengaged position, said locking handle means being pivotally secured to said locking slide means at a position thereon within said locking channel means to facilitate controlled movement thereof between the locking position and the unlocking position, said locking handle means extending through said first handle opening means into and through said locking channel means and outwardly through said second handle opening means, said locking handle means being pivotally attached with respect to said locking housing means at a position outside of said locking channel means adjacent said second handle opening means, said locking handle means including a handle grip section positioned outside of said locking channel means adjacent said first handle opening means to facilitate grasping thereof for urging movement of said locking slide means between the engaged position and the disengaged position; and F. a hydraulic damper member pivotally secured to said base member and pivotally secured with respect to said second upper arm of said arm assembly to facilitate stabilizing of the movement of said arm assembly between the tank storage position and the tank servicing position.

* * * * *